(12) United States Patent
Park et al.

(10) Patent No.: US 7,871,014 B2
(45) Date of Patent: Jan. 18, 2011

(54) SYSTEM FOR CONTROLLING DEMAND OF MULTI-AIR-CONDITIONER

(75) Inventors: Han-Won Park, Seoul (KR); Sang-Chul Youn, Seoul (KR); Duck-Gu Jeon, Seoul (KR)

(73) Assignee: LG Electronics Inc., Seoul (KR)

(*) Notice: Subject to any disclaimer, the term of this patent is extended or adjusted under 35 U.S.C. 154(b) by 462 days.

(21) Appl. No.: 11/945,116

(22) Filed: Nov. 26, 2007

(65) Prior Publication Data

US 2008/0179411 A1 Jul. 31, 2008

(30) Foreign Application Priority Data

Jan. 26, 2007 (KR) ............... 10-2007-0008573

(51) Int. Cl.
*G05D 23/00* (2006.01)
(52) U.S. Cl. .............. 236/51; 62/175; 165/208
(58) Field of Classification Search ......... 62/175, 62/230, 125; 165/208, 209; 700/276, 295, 700/296; 236/46 R, 51; 340/870.01
See application file for complete search history.

(56) References Cited

U.S. PATENT DOCUMENTS

| | | | | |
|---|---|---|---|---|
| 4,646,528 A * | 3/1987 | Marcade et al. | ............... | 62/127 |
| 4,830,095 A * | 5/1989 | Friend | ............... | 165/208 |
| 5,207,070 A * | 5/1993 | Miyazaki | ............... | 62/160 |
| 5,249,432 A * | 10/1993 | Ichikawa | ............... | 62/197 |
| 5,303,767 A * | 4/1994 | Riley | ............... | 165/208 |
| 5,390,506 A * | 2/1995 | Sogabe et al. | ............... | 62/175 |
| 5,499,510 A * | 3/1996 | Yoshida et al. | ............... | 62/175 |
| 5,531,076 A * | 7/1996 | Pellenz et al. | ............... | 62/184 |
| 5,622,221 A * | 4/1997 | Genga et al. | ............... | 165/208 |
| 5,682,949 A * | 11/1997 | Ratcliffe et al. | ............... | 165/209 |
| 5,729,474 A * | 3/1998 | Hildebrand et al. | ............... | 700/276 |
| 5,743,101 A * | 4/1998 | Shida et al. | ............... | 62/175 |
| 6,067,482 A * | 5/2000 | Shapiro | ............... | 700/286 |
| 6,195,018 B1 * | 2/2001 | Ragle et al. | ............... | 340/870.01 |
| 6,298,677 B1 * | 10/2001 | Bujak, Jr. | ............... | 62/158 |
| 6,510,703 B1 * | 1/2003 | Weng | ............... | 62/230 |
| 6,539,736 B1 * | 4/2003 | Isazawa et al. | ............... | 62/175 |
| 6,625,996 B2 * | 9/2003 | Nakajima et al. | ............... | 62/175 |
| 6,843,066 B2 * | 1/2005 | Lee et al. | ............... | 62/175 |
| 6,931,872 B2 * | 8/2005 | Kaga et al. | ............... | 62/228.4 |
| 6,978,194 B2 * | 12/2005 | McIlhany et al. | ............... | 700/276 |
| 7,062,927 B2 * | 6/2006 | Kwon et al. | ............... | 62/126 |
| 7,472,558 B1 * | 1/2009 | Narita | ............... | 62/175 |
| 7,503,182 B2 * | 3/2009 | Bahel et al. | ............... | 62/127 |
| 2003/0079483 A1 * | 5/2003 | Komatsu et al. | ............... | 62/148 |
| 2003/0216837 A1 * | 11/2003 | Reich et al. | ............... | 700/276 |

(Continued)

FOREIGN PATENT DOCUMENTS

GB 2153605 A * 8/1985

*Primary Examiner*—George Nguyen
(74) *Attorney, Agent, or Firm*—Birch, Stewart, Kolasch & Birch, LLP

(57) ABSTRACT

A system for controlling multiple air conditioners. The system includes a demand control unit configured to calculate an estimated power amount used by the multiple air conditioners based on an amount of power consumed by the multiple air conditioners during a predetermined time period, and to forcibly control an operation of one or more air conditioners based on a size of the estimated power amount. Further, the demand control unit is connected to the multiple air conditioners and communicates with the multiple air conditioners using a serial data communication protocol.

21 Claims, 2 Drawing Sheets

U.S. PATENT DOCUMENTS

| | | | |
|---|---|---|---|
| 2004/0107717 A1* | 6/2004 | Yoon et al. | 62/230 |
| 2004/0133314 A1* | 7/2004 | Ehlers et al. | 700/276 |
| 2005/0076659 A1* | 4/2005 | Wallace et al. | 62/157 |
| 2005/0091998 A1* | 5/2005 | Cho et al. | 62/175 |
| 2005/0143863 A1* | 6/2005 | Ruane et al. | 700/276 |
| 2005/0182498 A1* | 8/2005 | Landou et al. | 700/20 |
| 2005/0204758 A1* | 9/2005 | Kwon et al. | 62/175 |
| 2006/0080980 A1* | 4/2006 | Lee et al. | 62/157 |
| 2006/0130496 A1* | 6/2006 | Chapman et al. | 62/126 |
| 2006/0191275 A1* | 8/2006 | Jung et al. | 62/228.1 |
| 2007/0043478 A1* | 2/2007 | Ehlers et al. | 700/276 |
| 2008/0098753 A1* | 5/2008 | Allison et al. | 62/66 |
| 2008/0178615 A1* | 7/2008 | Yoon et al. | 62/79 |
| 2010/0010679 A1* | 1/2010 | Kassel | 700/278 |

* cited by examiner

SYSTEM FOR CONTROLLING DEMAND OF MULTI-AIR-CONDITIONER

CROSS-REFERENCE TO RELATED APPLICATIONS

This application claims priority to Korean Application No. 10-2007-0008573, filed in Korea on Jan. 26, 2007, the entire contents of which is also hereby incorporated in its entirety.

BACKGROUND OF THE INVENTION

1. Field of the Invention

The present invention relates to a system and method for collectively monitoring and controlling multiple air conditioners installed in each area of a building.

2. Description of the Related Art

Many buildings include air conditioners that are controlled to maintain areas or rooms in the building at a predetermined temperature. Thus, the air conditioners are controlled such that a particular air conditioner is shut off when the temperature in the corresponding room is within a predetermined temperature. When the temperature in the corresponding room is not within the predetermined temperature range, the air conditioner is turned back on.

The air conditioners require additional power besides the power supplied for lighting and security systems also included in the building. Therefore, the overall costs related to operating a building continue to increase. However, the related art method of controlling air conditioners merely turns on and off air conditioners based on temperatures within a room, but does not effectively deal with the power consumed by the multiple air conditioners.

SUMMARY OF THE INVENTION

Accordingly, one object of the present invention is to address the above-noted and other problems.

Another object of the present invention is to provide a system and method for controlling multiple air conditioners that effectively manages the power consumption amount of an entire building.

To achieve these and other advantages and in accordance with the purpose of the present invention, as embodied and broadly described herein, the present invention provides in one aspect a system for controlling multiple air conditioners. The system includes a demand control unit configured to calculate an estimated power amount used by the multiple air conditioners based on an amount of power consumed by the multiple air conditioners during a predetermined time period, and to forcibly control an operation of one or more air conditioners based on a size of the estimated power amount. Further, the demand control unit is connected to the multiple air conditioners and communicates with the multiple air conditioners using a serial data communication protocol.

In another aspect, the present invention provides a method for controlling multiple air conditioners. The method includes calculating an estimated power amount used by the multiple air conditioners based on an amount of power consumed by the multiple air conditioners during a predetermined time period, and forcibly controlling an operation of one or more air conditioners based on a size of the estimated power amount. Further, the forcibly controlling step uses a serial data communication protocol to forcibly control the operation of the one or more air conditioners.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Figure 1:
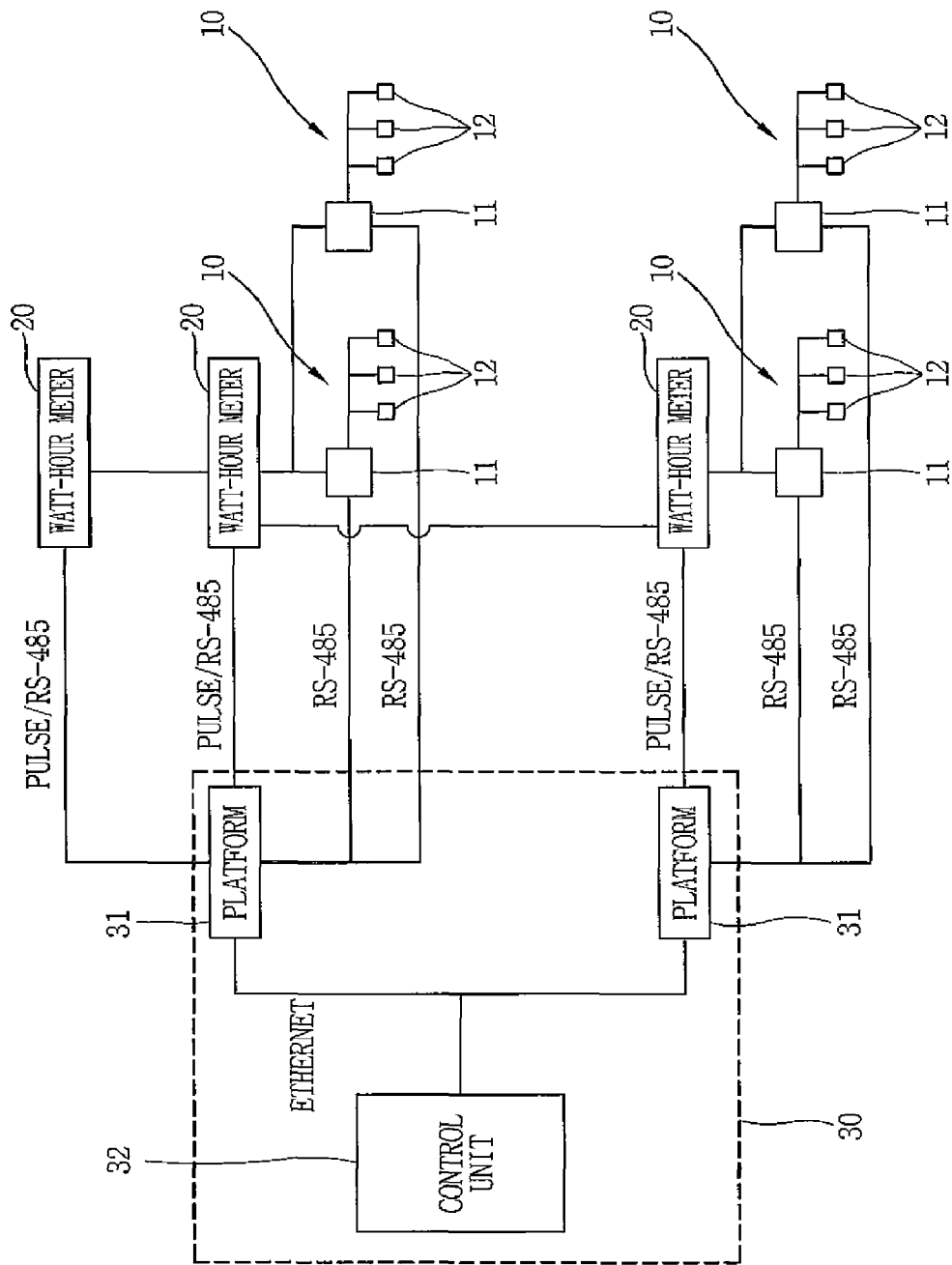
FIG. 1 is a block diagram illustrating a system for controlling multiple air conditioners according to an embodiment of the present invention.

FIG. 1 is a block diagram illustrating a system for controlling multiple air conditioners according to an embodiment of the present invention. As shown in FIG. 1, the system includes a demand control unit 30, multiple watt-hour meters 20, and multiple air conditioners 10. Further, the multiple air conditioners 10 are installed in each area of a building and perform an air-conditioning operation. The air conditioners 10 also include outdoor units 11 connected to indoor units 12.

In addition, the watt-hour meters 20 are connected with the multiple air conditioners 10 and detect an amount of power used by the corresponding air conditioners 10. Further, the demand control unit 30 obtains an overall power consumption amount used by the air conditioners 10 based on the amount of power amount detected from the multiple watt-hour meters 20, and calculates an operation rate according to a size of the overall power amount. The operation rate of the air conditioners 10 may be a number of air conditioners 10 to forcibly control or may be a particular operating mode to be applied to the air conditioners 10.

The demand control unit 30 then forcibly controls one or more air conditioners 10 in a sequential manner according to the calculated operation rate. The demand control unit 30 may also control the one or more air conditioners 10 based on a priority level assigned to the air conditioners 10. For example, a manager or engineer of a building may set particular priority levels for the air conditioners, and then the demand control unit 30 forcibly controls an air conditioner having a lower priority level first such that lower priority air conditioners are forcibly controlled before higher priority air conditioners. Therefore, the manager or engineer can designate an air conditioner that is very important with the highest priority level such that it is forcibly controlled last (or not forcibly controlled at all).

That is, because the forcibly controlling operation is performed such that the multiple air conditioners 10 use a power amount that is within a predetermined range, some of the air conditioners 10 will have to be turned off or have their operating mode changed to a mode that uses less power. Thus, it is preferably to prioritize the air conditioners such that important air conditioners (e.g., an air conditioner or air conditioners in a computer room) are forcibly controlled last or not forcibly controlled at all.

The air conditioners may also be divided into groups and each group assigned a priority level. Then, the demand control unit 30 forcibly controls the multiple air conditioners 10 based on the priority levels assigned to the group. For example, the demand control unit 30 can forcibly control multiple air conditioners in a lowest priority group in a sequential manner (one after the other) or may also control air conditioners in a lowest priority group based on previously set priority levels for each air conditioner in the group. That is, each group of air conditioners can be assigned a priority level, and each air conditioner in each group can also be assigned a priority level.

Further, the priority levels may be set by a manager or may be automatically determined by the demand control unit 30. For example, the demand control unit 30 may use the temperature of a room air conditioned by a respective air conditioner 10 (or multiple air conditioners 10). That is, the demand control unit 30 can compare temperatures of different rooms or spaces within a building and forcibly control air conditioners 10 in rooms that have the smallest difference between a desired temperature and the actual temperature.

The recorded history of the air conditioners 10 may also be used when determining how to control the multiple air conditioners 10. That is, priority levels may be assigned to air conditioners 10 based on how often or how recently they have been forcibly controlled. For example, air conditioners 10 that have been forcibly controlled most recently or more often can be assigned higher priority levels than other air conditioners 10 such that the higher priority air conditioners 10 are not forcibly controlled or forcibly controlled last. These different types of controlling methods advantageously allow for the multiple air conditioners 10 to be controlled in a balanced manner.

Further, as shown in FIG. 1, the demand control unit 30 includes one or more platforms 31 that are connected with one or more air conditioners 10 and the watt-hour meters 20. The platforms 31 receive the amount of power detected by the watt-hour meters 20. The demand control unit 30 also includes a control unit 32 that calculates an estimated amount of power used by the air conditioners 10 based on the received amount of power from the platforms 31 and controls one or more air conditioners based on the estimated amount of power. In addition, the one or more of the platforms 31 include a gateway configured to communicate with the watt-hour meters 20 in a first communication method (e.g., pulse or RS-485 method) and to communicate with the control unit 32 based on a second communication method (e.g., Ethernet method) that is different than the first communication method.

Further, the watt-hour meters 20 measure the amount of power consumed by the corresponding air conditioners 10 and transfer the measured amount to the platforms 31. Also, the watt-hour meters 20 include an individual watt-hour meter connected with respective air conditioners 10 and an overall watt-hour meter that measures the amount of power consumed by the entire system.

As shown in the embodiment of FIG. 1, the air conditioners 10 are connected to the platforms 31 via an RS-485 communication method (protocol) that is suitable for long distance networks. That is, the distance between the platforms 31 and the air conditioners 10 can be several meters, especially in large buildings. Further, the watt-hour meters 20 are preferably connected to the platforms 31 using a pulse input method. However, the watt-hour meters 20 can also be connected to the platforms 31 via the RS-485 communication method to allow long distance communication when the watt-hour meters 20 are far away from the demand control unit 30. In addition, the control unit 32 and the platforms 31 are preferably connected to each other via an Ethernet communication method (protocol) so as to be controlled by remote communications.

Further, the platforms 31 are connected with the outdoor units 11 of the air conditioners 10, and transfer a control command of the control unit 32 to the outdoor units 11. That is, the platforms 31 of the demand control unit 30 send control commands to turn on and off the outdoor units 11 such that an overall amount of power used by the air conditioners 10 is maintained within a predetermined allowable range. The control commands may also turn on and off select indoor units 12.

Figure 2:
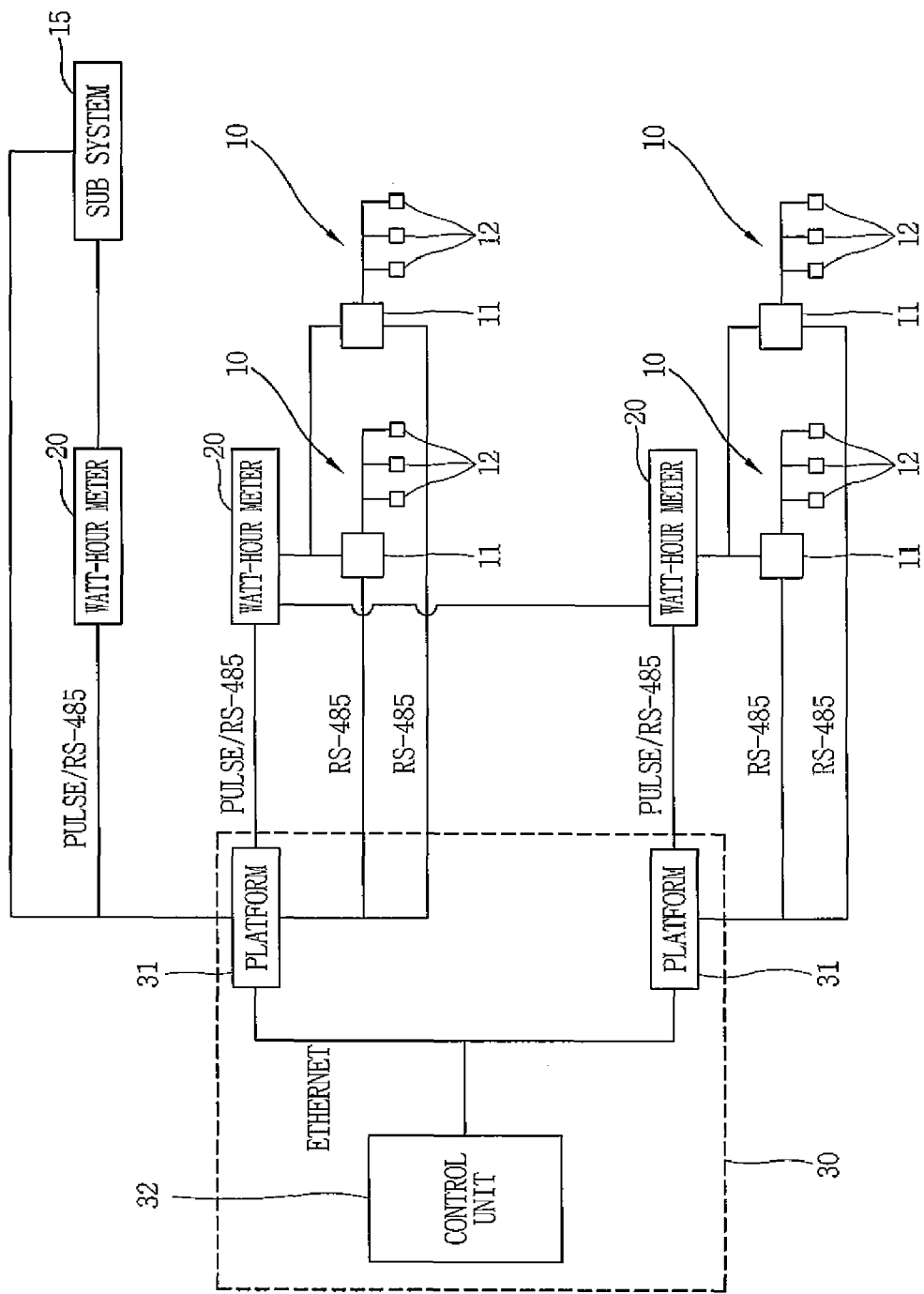
FIG. 2 is a block diagram illustrating a system for controlling multiple air conditioners according to another embodiment of the present invention.

FIG. 2 is a block diagram illustrating a system for controlling multiple air conditioners according to another embodiment of the present invention. Note that FIG. 2 is similar to FIG. 1, except that in FIG. 2, the demand control unit 30 is connected with a sub-system 15 such as a lighting system or an electric motor, so that when an estimated power consumption amount in the building exceeds a maximum demand power amount, the power consumption amount of the sub-system 15 can be controlled.

Thus, in the system for controlling multiple air conditioners as described above, while the multiple air conditioners 10 disposed in the building perform an air cooling operation or an air heating operation, the watt-hour meters 20 periodically monitor and measure the power consumption amount of the air conditioners 10. Further, the information on the power consumption amount is transferred to the control unit 32 through the platforms 31, and accordingly, the control unit 32 estimates a power amount based on the power amount consumed during a certain time and monitors whether or not the estimated power amount exceeds the pre-set demand power amount (the maximum demand power amount).

When the estimated power amount exceeds the maximum demand power amount, the control unit 32 transfers an air conditioner operation rate control command to the air conditioners 10 through the platforms 31 so that the air conditioners 10 can be controlled such that their power consumption amount is reduced. That is, if the overall power consumption amount is greater than the pre-set maximum demand power amount, the control unit 32 forcibly operates one or more air conditioners 10 to reduce their power consumption amount (e.g., by turning off the outdoor unit or indoor units), whereas if the overall power consumption amount is smaller than the pre-set maximum demand power amount, the control unit 32 maintains the operation state of the one or more air conditioners 10 or returns the air conditioners 10 which were previously controlled to their initial operating mode.

In addition, the air conditioners 10 can also be controlled by changing their operation mode to a mode that uses less power (rather than just turning off the outdoor unit 11 and/or indoor units 12 of the air conditioner 10). For example, the operation mode of the air conditioner 10 may be changed from an air condition mode to an air blowing mode only, to a dehumidifying mode, etc. The air flow amount and a circulation speed of a refrigerant may also be reduced to thereby lower the overall amount of power used by the multiple air conditioners 10.

In addition, when the sub-system 15 such as the lighting system or an electric motor, etc., in the building is connected with the demand control unit 30, the operation of the sub-system 15 can also be controlled to reduce the overall power consumption amount of the systems included in the building.

As so far described, the system for controlling multiple air conditioners according to embodiments of the present invention has several advantages.

That is, for example, because the demand control unit 30 controls the power consumption amount of the air conditioners, which generally consume most of the power compared to other systems in the building, the overall power consumption amount in the entire building can be effectively managed.

In addition, because the air conditioners 10 and the platforms 31 are connected according to the RS-485 communication method, the watt-hour meters 20 and the platforms 31 are connected according to the RS-485 communication method, and the platforms 31 and the control unit 32 are connected according to the Ethernet communication method, the multiple air conditioners can be remotely controlled.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A system for controlling multiple air conditioners, the system comprising:
   a demand control unit configured to calculate an estimated power amount used by the multiple air conditioners based on an amount of power consumed by the multiple air conditioners during a predetermined time period, and to forcibly control an operation of one or more air conditioners based on a size of the estimated power amount;
   one or more individual watt-hour meters, each being connected with respective air conditioners and configured to measure the power consumed by each of the one or more air conditioners; and
   an overall watt-hour meter configured to measure the amount of power consumed by the entire system,
   wherein the demand control unit is connected to the multiple air conditioners and communicates with the multiple air conditioners using a serial data communication protocol.

2. The system of claim 1, wherein the demand control unit comprises:
   one or more platforms connected with the one or more air conditioners and the one or more individual watt-hour meters, said one or more platforms configured to receive the amount of power consumed by the multiple air conditioners during the predetermined time period and power from the one or more individual watt-hour meters; and
   a control unit that controls the one or more air conditioners based on the power amount received from the one or more platforms.

3. The system of claim 2, wherein the one or more platforms comprise:
   a gateway configured to communicate with the individual watt-hour meters using a first communication method and to communicate with the control unit using a second communication method that is different than the first communication method; and
   a communication control unit that controls communication between the gateway and the individual watt-hour meters.

4. The system of claim 2, wherein the one or more platforms are connected to the multiple air conditioners and communicate with the multiple air conditioners via a serial data communication protocol, and
   wherein the serial data communication protocol is the RS-485 communication protocol.

5. The system of claim 2, wherein the one or more platforms communicate with the individual watt-hour meters using the RS-485 serial communication protocol or a pulse input method.

6. The system of claim 2, wherein the one or more platforms communicate with the control unit using the Ethernet protocol.

7. The system of claim 1, wherein the demand control unit compares the estimated power amount and a pre-set target power amount, calculates an operation rate of said one or more air conditioners based on the comparison result, assigns priority levels to said one or more air conditioners, and forcibly controls the operation of said one or more air conditioners based on the assigned priority levels.

8. The system of claim 7, wherein the demand control unit divides the multiple air conditioner into groups and assigns each group a priority level such that the demand control unit forcibly controls an operation of air conditioners included in a lower assigned priority level group before air conditioners included in a higher priority level group.

9. The system of claim 7, wherein the demand control unit records a forcibly control history of the multiple air conditioners, assigns the priority levels to the multiple air conditioners based on the recorded forcibly control history of the multiple air conditioners, and forcibly controls the operation of said one or more air conditioners based on the assigned priority levels.

10. The system of claim 9, wherein the demand control unit assigns a higher priority level to a first air conditioner that has been forcibly controlled more recently or more often than a second air conditioner such that the demand control unit forcibly controls the second air conditioner before the first air conditioner.

11. The system of claim 2, wherein the demand control unit forcibly controls the operation of a respective air conditioner by turning off at least one of an outdoor unit and indoor unit of the respective air conditioner or by reducing an operation mode of the respective air conditioner.

12. A method for controlling multiple air conditioners, the method comprising:
   measuring an amount of power consumed by each of one or more air conditioners via each of one or more individual watt-hour meters during a predetermined time period;
   measuring an amount of power consumed by the multiple air conditioners via an overall watt-hour meter during the predetermined time period;
   calculating an estimated power amount used by the multiple air conditioners based on the amount of power consumed by the multiple air conditioners during the predetermined time period; and
   forcibly controlling an operation of the one or more air conditioners based on a size of the estimated power amount,
   wherein the forcibly controlling step uses a serial data communication protocol to forcibly control the operation of the one or more air conditioners.

13. The method of claim 12, wherein the multiple air conditioners are connected to one or more platforms and the one or more individual watt-hour meters, said one or more platforms receiving the amount of power consumed by the multiple air conditioners during the predetermined time period and power from the one or more individual watt-hour meters, and wherein the forcibly controlling step forcibly controls the one or more air conditioners based on the power amount received from the one or more platforms.

14. The method of claim 13, wherein the one or more platforms communicate with the individual watt-hour meters using the RS-485 serial communication protocol or a pulse input method.

15. The method of claim 13, wherein the one or more platforms communicate with the multiple air conditioners using the RS-485 communication protocol.

16. The method of claim 13, wherein the one or more platforms are connected to a control unit that performs the forcibly controlling step, and wherein the one or more platforms and the control unit communicate using an Ethernet communication protocol.

17. The method of claim 12, further comprising:

comparing the estimated power amount and a pre-set target power amount;

calculating an operation rate of said one or more air conditioners based on the comparison result; and assigning priority levels to said one or more air conditioners, wherein the forcibly controlling step forcibly controls the operation of said one or more air conditioners based on the assigned priority levels.

18. The method of claim 17, further comprising:

dividing the multiple air conditioner into groups; and assigning each group a priority level such that the demand control unit forcibly controls an operation of air conditioners included in a lower assigned priority level group before air conditioners included in a higher priority level group.

19. The method of claim 17, further comprising:

recording a forcibly control history of the multiple air conditioners, wherein the assigning step assigns the priority levels to the multiple air conditioners based on the recorded forcibly control history of the multiple air conditioners, and wherein the forcibly controlling step forcibly controls an operation of an air conditioner based on the assigned priority levels.

20. The method of claim 19, wherein the assigning step assigns a higher priority level to a first air conditioner that has been forcibly controlled more recently or more often than a second air conditioner such that the forcibly controlling step forcibly controls the second air conditioner before the first air conditioner.

21. The method of claim 13, wherein the forcibly controlling step forcibly controls the operation of a respective air conditioner by turning off at least one of an outdoor unit and indoor unit of the respective air conditioner or by reducing an operation mode of the respective air conditioner.

* * * * *